United States Patent [19]
Saito et al.

[11] Patent Number: 5,693,195
[45] Date of Patent: Dec. 2, 1997

[54] METHOD OF IRRADIATION WITH ELECTRON BEAMS

[75] Inventors: Mutsumi Saito; Takeshi Yoshioka; Tatsuya Nishimura, all of Kanagawa-ken, Japan

[73] Assignee: Ebara Corporation, Tokyo, Japan

[21] Appl. No.: 459,427

[22] Filed: Jun. 2, 1995

[30] Foreign Application Priority Data

Jun. 3, 1994 [JP] Japan .................................. 6-144135
May 25, 1995 [JP] Japan .................................. 7-126881

[51] Int. Cl.$^6$ .................................................. B01D 53/00
[52] U.S. Cl. ........................... 204/157.44; 204/157.46; 204/157.3; 588/247; 588/244
[58] Field of Search .................... 204/157.3, 157.46, 204/157.44; 588/247, 244

[56] References Cited

U.S. PATENT DOCUMENTS

| | | | |
|---|---|---|---|
| 4,004,995 | 1/1977 | Machi et al. | 204/157.46 |
| 4,389,573 | 6/1983 | Itoh . | |
| 4,435,260 | 3/1984 | Koichi et al. . | |
| 4,882,020 | 11/1989 | Maezawa et al. | 204/157.3 |
| 4,915,916 | 4/1990 | Ito et al. | 204/157.46 |
| 5,244,552 | 9/1993 | Namba et al. | 204/157.3 |
| 5,397,444 | 3/1995 | Zimek et al. | 204/157.3 |

FOREIGN PATENT DOCUMENTS

| | | |
|---|---|---|
| 5-15737 | 1/1993 | Japan . |
| 5-161821 | 6/1993 | Japan . |
| 6-501202 | 2/1994 | Japan . |

OTHER PUBLICATIONS

Detection & Control of Environmental Pollution, Technique of Preventing Air Pollution, Report on Research (II), Feb. 1978, pp. 19–25, Seiichiro Koda, et al., "Chemical Studies on Technique of Removing Gas Contamination by Electron Beams" (with English translation).

Primary Examiner—Kathryn L. Gorgos
Assistant Examiner—Kishor Mayekar
Attorney, Agent, or Firm—Oblon, Spivak, McClelland, Maier & Neustadt, P.C.

[57] ABSTRACT

A method by which irradiation treatment of an exhaust gas with electron beams can be performed in a more space- and energy efficient manner. The method in which an exhaust gas containing nitrogen oxides (NOx) is irradiated with electron beams so as to form by-products, which are then separated whereas the treated exhaust gas is liberated into air atmosphere, characterized in that electron beams are generated in such a way that they have a pulsed temporal and spatial shape within an electron beam generator, with the pulse frequency and duration being in the respective ranges of 10 Hz–100 kHz and $10^{-8}$–$10^{-5}$ second whereas the non-irradiation region lasts for a time interval of $10^{-5}$–$10^{-1}$ second.

2 Claims, 6 Drawing Sheets

DOSE RATE DISTRIBUTION AT 750kV
(ON ONE SIDE)

METHOD OF IRRADIATION WITH ELECTRON BEAMS

BACKGROUND OF THE INVENTION

1. Field of the Invention

This invention relates to a method of irradiation with electron beams which is applicable to the treatment of exhaust gases or surface modification of various substances.

2. Discussion of the Background

Conventional apparatus for achieving irradiation with electron beams generate electrons in the form of a dc current. The generated electrons usually trace the primary target such as exhaust gases. However, their tracing frequencies are higher than the gas flow rate; in addition, the electron beams, after coming into the gas, will diffuse and diverge as shown in FIG. 4. Hence, the electron beams may well be considered to be in the process of steady-state irradiation near the electron-beam generator. As a result, the primary target is excited and activated by the applied electrons, whereupon it undergoes dissociation, binding with the surrounding substances and other reactions to form intermediate products. Upon repeated irradiations, the intermediate products are decomposed by reactions that proceed in a reverse direction to the desired reaction. This has been a cause of limited efficiency in the treatment by irradiation with electron beams.

To deal with this problem, the irradiation with electron beams may be stopped to allow for a certain temporal and spatial interval after the formation of intermediate products and other conditions may properly be adjusted to insure the production of the final end substance. One can improve the efficiency of treatment with a given total quantity of beam exposure by performing irradiation with electron beams at a plurality of stages, with a beam interrupting time and space being provided between successive stages. In fact, if steady-state irradiation with electron beams is replaced by a multi-stage application of the same dose of electrons to the overall quantity of the gas to be treated, the efficiency of treatment is improved over the single-stage irradiation. This is known as a "multi-stage effect" and it has been commercialized (see Japanese Patent No. 1,265,778 to Yamada et al.)

However, in order to exploit this "multi-stage effect" on a dc electron-beam generator, more than one unit of the beam generator is necessary or, alternatively, a comparable effect must be achieved by physical deletion of electron beams. This has presented several problems such as beam loss and larger installation space; the latter problem is firstly due to the divergence of electron beams that are admitted into the gas to be treated (see FIG. 4) and the second problem is due to the need for setting up a plurality of dc electron beam generators.

SUMMARY OF THE INVENTION

The present invention has been accomplished under these circumstances and has as an object providing a method by which irradiation with electron beams can be performed in a more space- and energy-efficient manner.

This object of the invention can be attained by a method of irradiating an exhaust gas with electron beams, in which pulsed electron beams having frequencies of 10 Hz–100 kHz and pulse durations of $10^{-8}$–$10^{-5}$ second are generated to exploit the so-called "multi-stage effect".

In order to improve the efficiency of irradiation with electron beams, the so-called "multi-stage effect" is attained in the prior art by spacing a plurality of electron-beam generators along the stream of an exhaust gas to be treated. In contrast, the present invention generates pulsed electron beams and applies them to an exhaust gas to be treated and, conceptually, a single unit of an electron-beam generator functions as more than one unit of electron-beam generators. This helps reduce the number of electron-beam generators that need be installed; additionally, a pulsed electron-beam generator is typically smaller in size than the dc electron-beam generator and, hence, the present invention also contributes to a marked reduction in the space necessary for installation electron-beam generators.

Other objects and advantages of the present invention may become apparent to those skilled in the art from the following description and drawings.

DESCRIPTION OF THE PREFERRED EMBODIMENT

A flow rate of exhaust gas to be treated is specified to lie between 1.0 m/s and 25 m/s for the following two reasons: in an experiment conducted by the present inventors, the superiority of pulsed electron beams over dc electron beams was apparent when the gas flow rate was at least 1.0 m/s; secondly, 25 m/s is the upper limit for the rate of an exhaust gas flowing through ordinary piping.

The temperature of the exhaust gas to be treated is specified not to be lower than the dew point for the following two reasons: 1) if the exhaust gas is colder than the dew point, water drops will condense on the inner surface of the exhaust gas piping and ammonium nitrate which is a by-product to the process of the invention will not be carried as far as to the outlet for the exhaust gas; 2) nitric acid will deposit on the inner surface of the piping to cause corrosion.

The upper limit for the temperature of the exhaust gas is 100° C. Because with the current electron-beam technology for the treatment of exhaust gases, certain reactions will proceed in reverse direction to the intended reactions for the exhaust gas treatment.

Electron beams are applied at doses within the range from 0.1 to 30 kGy. This dose range has heretofore been used effectively in the treatment of exhaust gases and a teaching thereof may be found in the following reference:

"COMBINED SO$_2$/NOx REMOVAL BY ELECTRON-BEAM PROCESSING"
Norman W Frank
Shinichi Hirano Presented at the Fourth Symposium on Integrated Environmental Control Cosponsored by Electric Power Research Institute, Air Pollution Control Association, and American Society of Mechanical Engineers Washington, D.C., Mar. 2–4, 1988.

Thus, the method of irradiation with pulsed electron beams produces an effect comparable to that heretofore achieved by multi-stage irradiation and yet the number of units of electron-beam generators that must be used and, hence, the requisite installation space, can be reduced.

Pulsed electron beams may be made divergent in an electric or magnetic field and this can typically be accomplished by using a quadrupole lens as described in Japanese Patent Application No. 14863/1994, entitled "Apparatus for Irradiation with Charged Particles".

Figure 5:
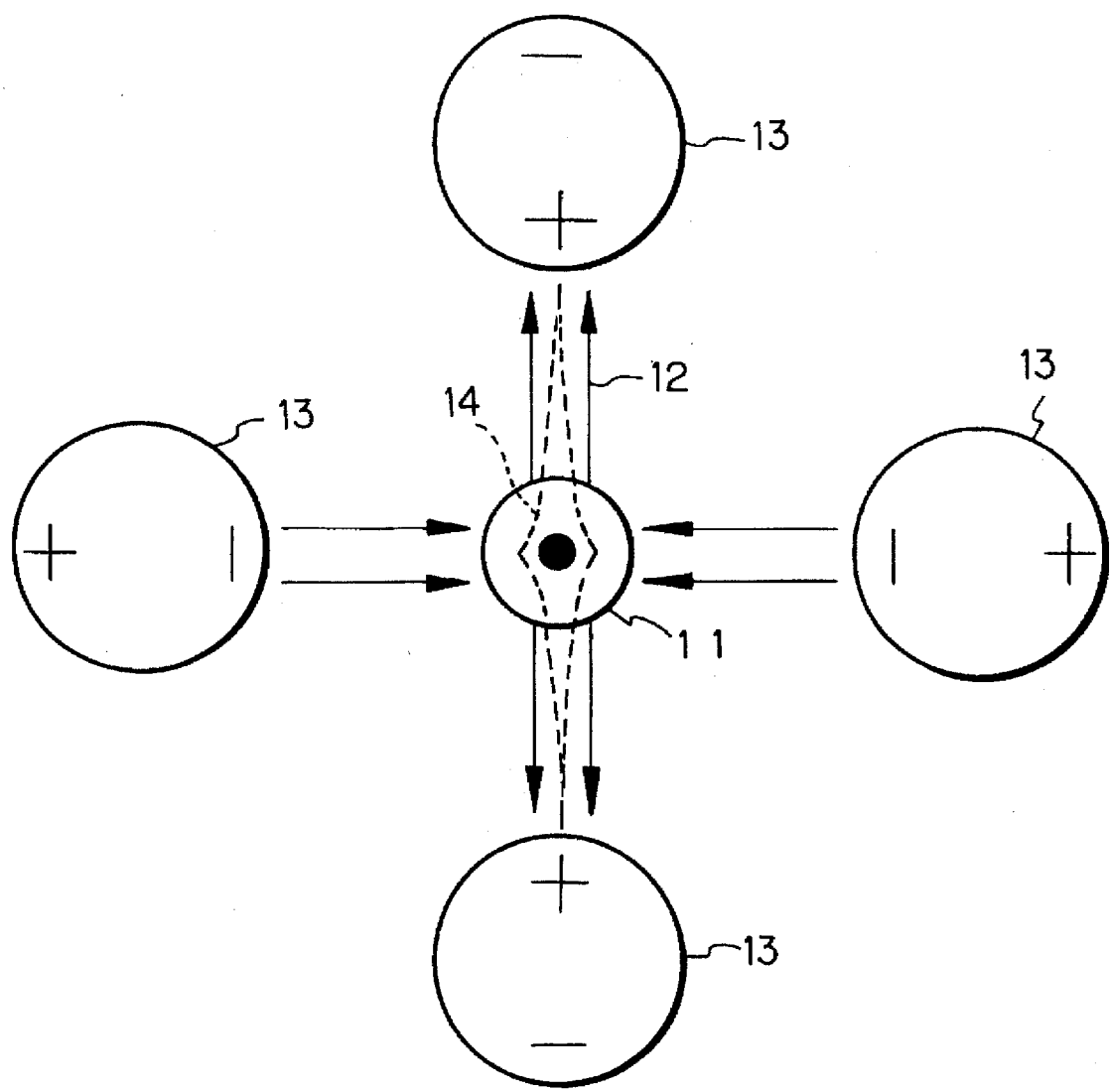
FIG. 5 depicts a method of diverging electron beams in an electric field.

FIG. 5 illustrates how electron beams can be diverged in an electric field. An electron beam 1 which is directed into the paper and which flows from the other side of the paper toward the viewer is made divergent as indicated by dotted lines 14 under the force that is created in directions 12 by electrodes having the polarities indicated by 13.

As described on the foregoing pages, the irradiation with pulsed electron beams allows a single unit of electron-beam generator to produce an effect comparable to that heretofore achieved by multi-stage irradiation. More efficient irradiation can be realized by using more than one unit of electron-beam generator in such a way that differently shaped pulses (in such aspects as frequency and duration) are applied to specific targets. This method of irradiation with electron beams not only allows for a reduction in the number of units of electron-beam generators and, hence, the requisite installation space, but also provides ease in the manipulation of equipment. Thus, the present invention holds much promise for offering great benefits to industry. Additionally, the treated exhaust gas either before or after the separation of by-products may be mixed with the yet to be treated exhaust gas and the mixture subjected to another treatment, whereby a further improvement in percent denitration can be accomplished.

Figure 1:
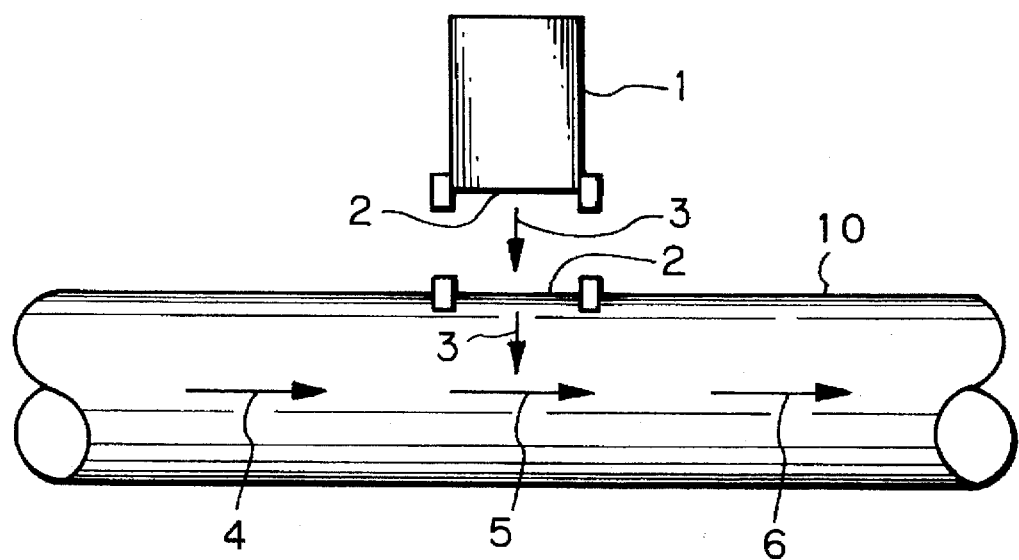
FIG. 1 is a schematic diagram for the method of irradiation with electron beams according to the preferred embodiment of the invention.
Figure 2:
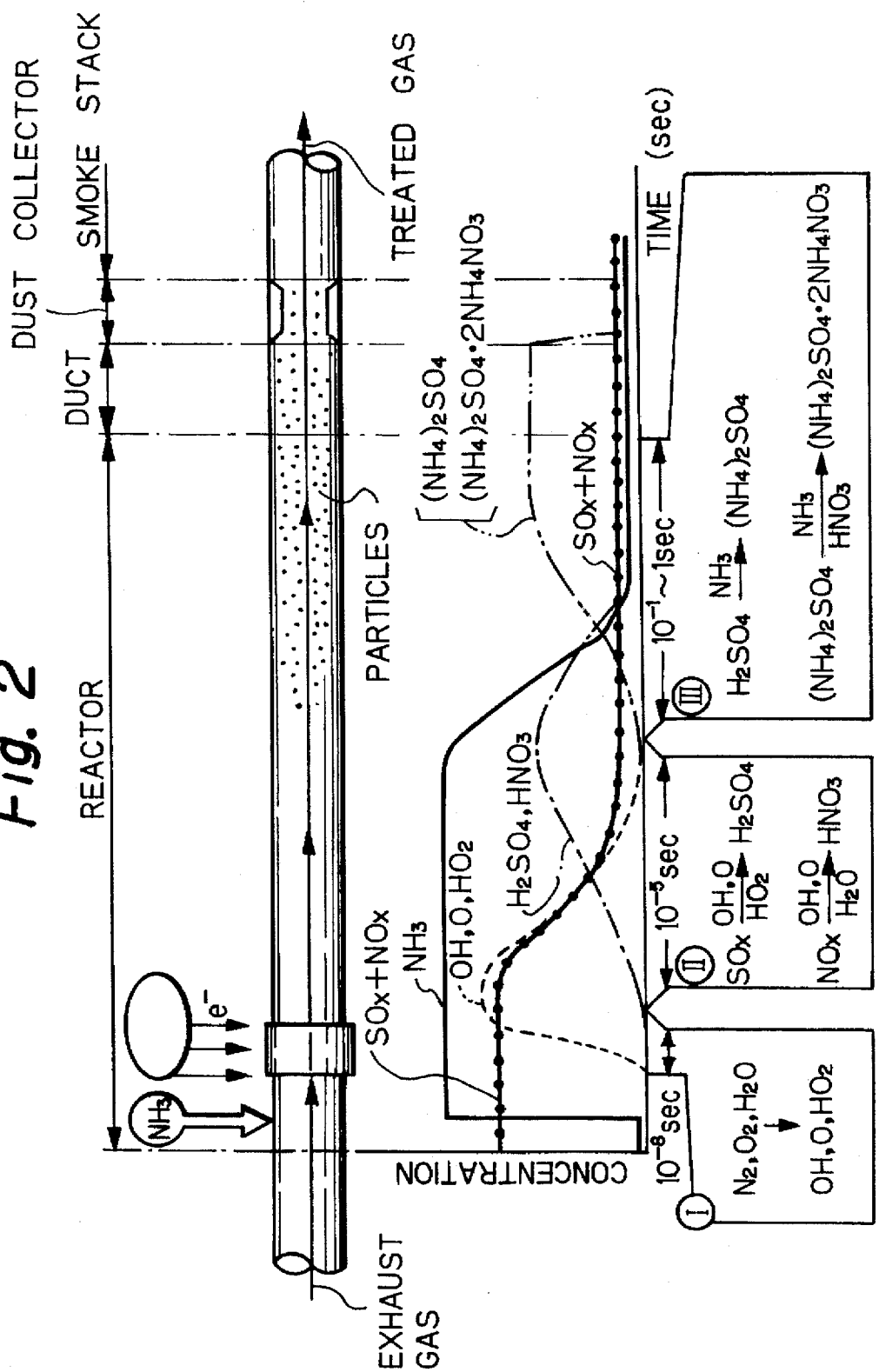
FIG. 2 is a chart describing an estimated time schedule for the process in which an ammonia atmosphere irradiated with electron beams changes from NO through intermediate products to the final end substance.
Figure 3:
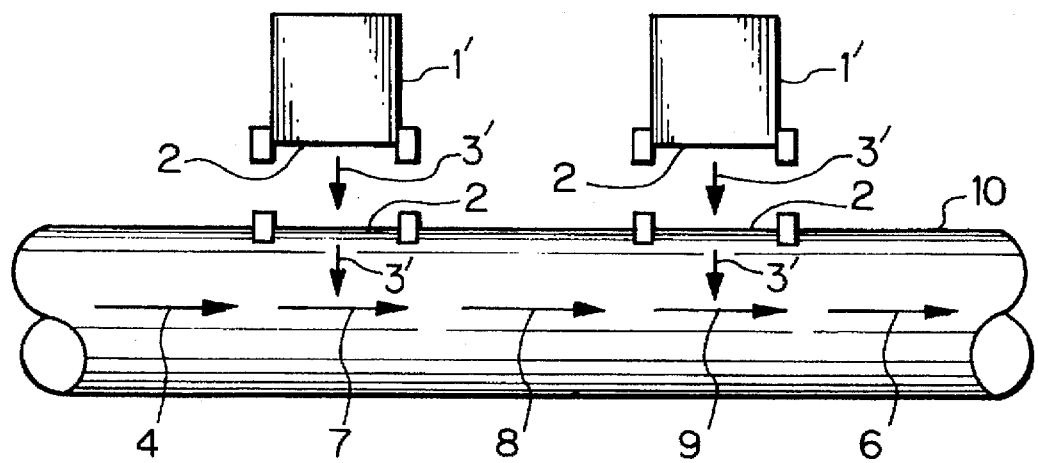
FIG. 3 is a schematic diagram for the prior art method of irradiation with electron beams which is intended to bring about the "multi-stage effect"
Figure 4:
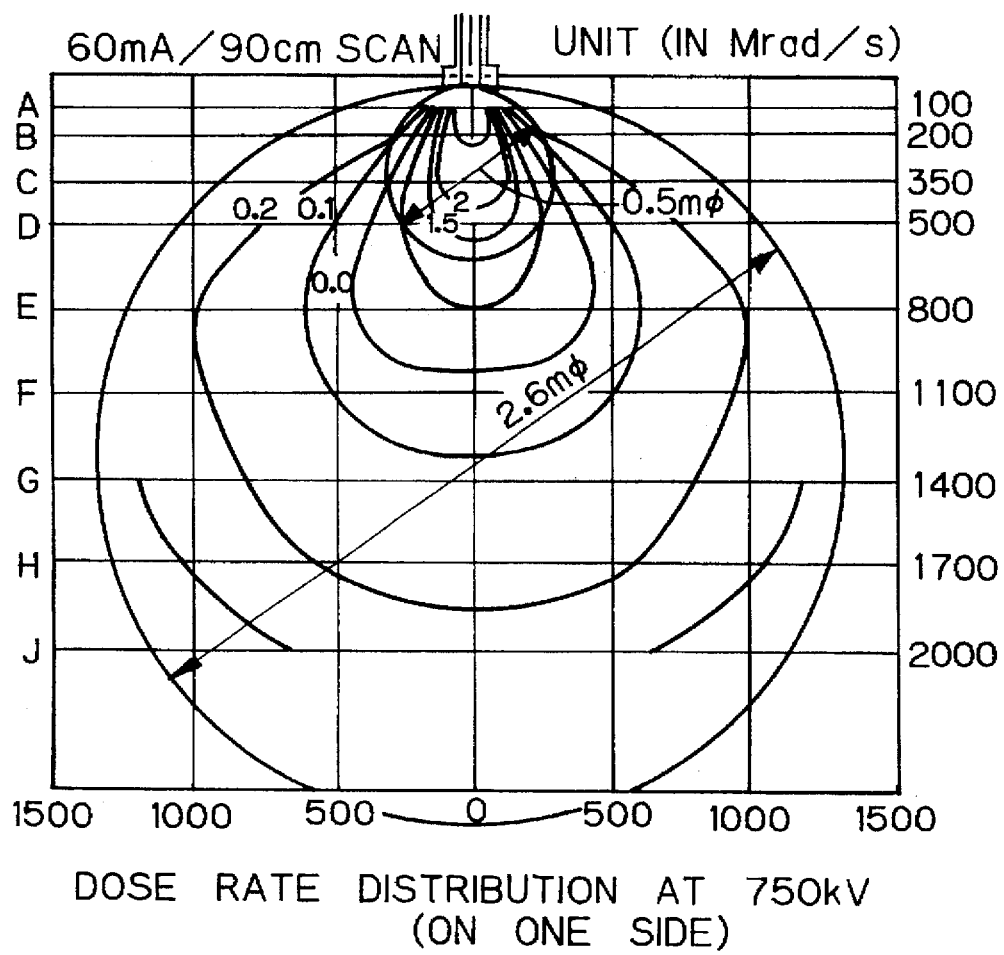
FIG. 4 illustrates how electron beams diverge when they are admitted into a gas.

The preferred embodiment of the invention will now be described with reference to the accompanying drawings. FIG. 1 is a schematic diagram for the method of irradiation with electron beams according to the preferred embodiment of the invention. FIG. 3 is a schematic diagram for the prior art method of irradiation with electron beams which is intended to bring about the "multi-stage effect". FIG. 2 is a chart describing an estimated time schedule for the process of changes which a nitrogen oxide, especially NO, in an exhaust gas irradiated with electron beams will experience until ammonium nitrate ($NH_4NO_3$) as the final end substance will be produced. In FIGS. 1–3, the parts which are the same as or equivalent to one another are identified by like numerals.

Referring to FIG. 3, dc electron-beam generators 1' each emit a dc electron beam 3', which passes through an electron-beam permeable membrane 2 to be admitted into an exhaust gas treating vessel 10. The exhaust gas in the vessel 10 is assumed to have an initial stream 4 that contains NO and other components. The gas stream 4 is irradiated with the electron beam 3' to become another gas stream 7. In addition to NO, an intermediate product $NO_3$ is also present in the gas stream 7. However, by continued irradiation with electron beams, $NO_3$ will decompose to $NO_2$ which, in turn, decomposes to NO through reactions that proceed in reverse directions to the desired reaction. Thus, there will occur reactions toward a lower concentration of $NO_3$. However, a gas stream 8 following the stream 7 is not irradiated with electron beams, so $NO_3$ will bind with the surrounding $NH_3$ to eventually form a stable component $NH_4NO_3$ (ammonium nitrate), which is present in admixture with NO that formed as the result of the reaction in reverse direction and which was not given any further energy. In a subsequent gas stream 9, the NO component of the gas stream 8 is irradiated with electron beams to become $NO_3$; $NH_4NO$ is also subjected to irradiation with electron beams but reactions are less likely to proceed in reverse direction to the desired reaction. Therefore, the gas stream 9 can safely be regarded as a mixture of $NO_3$ and $NH_4NO_3$. In the final gas stream 6, the $NO_3$ component of the gas stream 9 becomes $NH_4NO_3$, whereby denitration of the exhaust gas is accomplished. This is an outline of the prior art method of treating exhaust gases by relying upon the "multi-stage effect".

FIG. 1 shows schematically the method of irradiation with electron beams in accordance with the preferred embodiment of the invention. A pulsed electron-beam generator 1 emits a pulsed electron beam 3, which passes through an electron-beam permeable membrane 2 as in FIG. 3 to be admitted into an exhaust gas 4. Since the electron beam 3 consists of pulses, the process of changes from gas stream 7 through stream 8 to stream 9 which has been described in connection with FIG. 3 is completed in one step in the gas stream 5. As is clear from FIG. 2 which shows an estimated time schedule for the change from NO to $NH_4NO_3$ in a typical process of the treatment of an exhaust gas, it takes about $10^{-5}$ second for the intermediate $HNO_3$ to be produced. FIG. 2 also reveals that the irradiation time necessary for the generation of radicals is about $10^{-8}$ second. In other words, the electron beam to be used in the invention must have a pulse duration not shorter than $10^{-8}$ second, or the time of irradiation with electron beams necessary for the generation of radicals. As already mentioned, if electron beams are further applied after the generation of the intermediate product, the reaction for the production of the final end substance will not occur but reactions in reverse direction to the desired reaction (i.e., $NO_3 \rightarrow NO_2$ and $NO_2 \rightarrow NO$) will proceed. Hence in order to complete the aforementioned reactions, irradiation with electron beams for a time of at least $10^{-8}$ seconds must be followed by non-irradiation for a time of $10^{-5}$–$10^{-1}$ second. Since the above-described reverse reactions will take place if irradiation is continuous for longer than $10^{-5}$ seconds, an effective pulse duration ranges from $10^{-8}$ second to $10^{-5}$ second. To satisfy this condition for pulse duration, the pulse frequency must not be higher than 100 kHz ($10^{-5}$ Hz). On the other hand, the pulse frequency should not be lower than 10 Hz and this lower limit has been determined from the result of an experiment that demonstrated the superiority of the stated range.

Thus, in accordance with the invention, pulsed electron beams having pulse frequencies of 10 Hz–100 kHz and pulse durations of $10^{-8}$–$10^{-5}$ second, with the non-irradiation region lasting for a time interval of $10^{-5}$–$10^{-1}$ second, were found to be more effective than continuous electron beams that were emitted from the conventional dc electron-beam generator. The pulses for use in the invention have preferably a rectangular time-current characteristic curve. The upper limit for the pulse duration is defined to be not longer than $10^{-5}$ second which are required for the generation of the intermediate product $HNO_3$. It should, however, be noted that the "multi-stage effect" was found to occur even when the pulse duration was as long as $10^{-4}$ second. It should also be mentioned that the pulse frequency and duration are desirably selected in accordance with the specific components of the target gas.

The pulse current (mA) should be selected from the range of about 10 milliamperes to several amperes as appropriate for the concentrations of the components to be removed from the exhaust gas. It should be mentioned that if the exhaust gas contains not only NOx but also SOx, the latter will not undergo reactions in the reverse direction as a result of continued irradiation with electron beams and, hence, one can expect desulfurization to be achieved by amounts that increase with the dose of exposure to electron beams.

Figure 7:
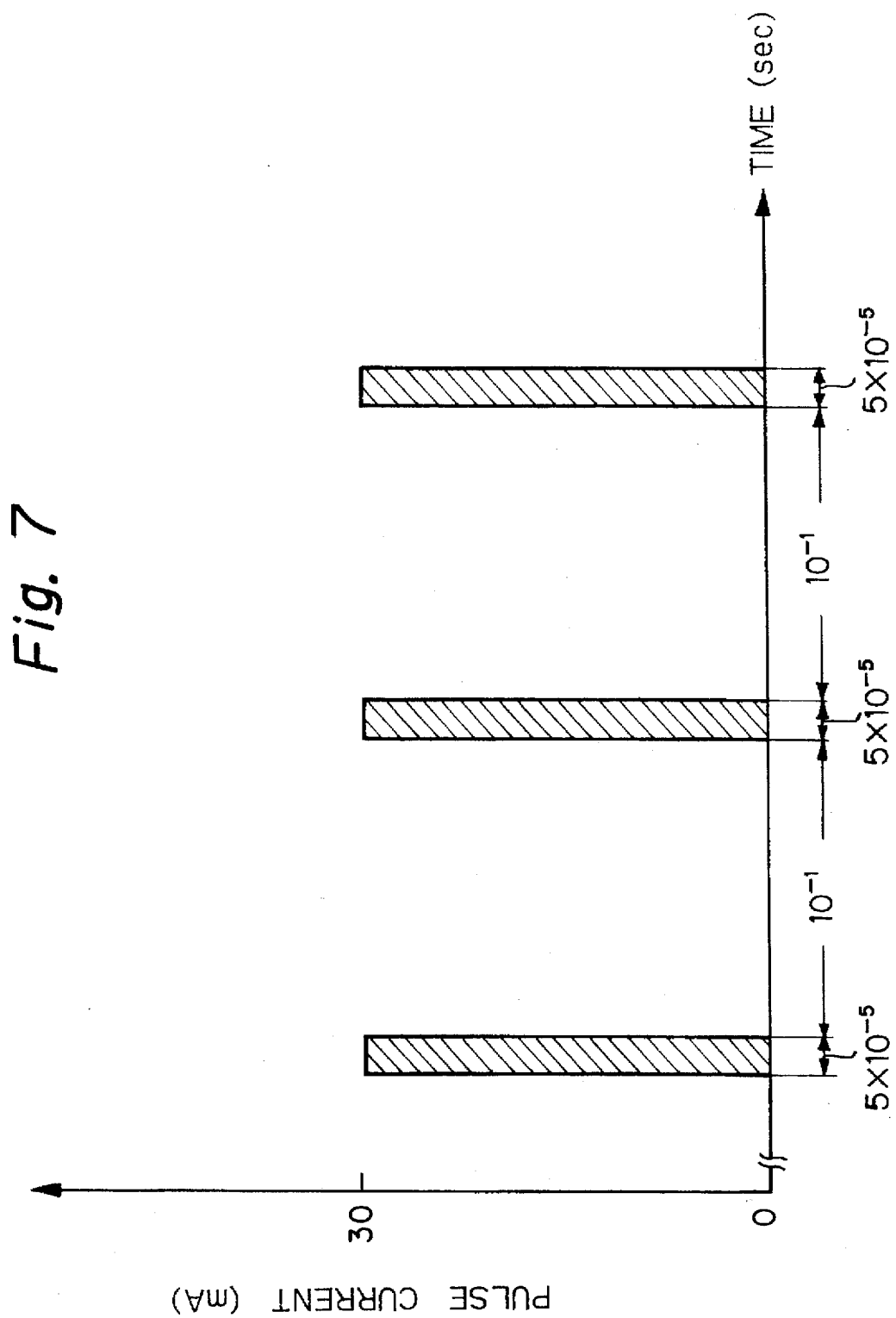
FIG. 7 shows the temporal profile of the pulse current employed in Example 1.

FIG. 7 shows the pulsed current for use in the invention as a function of time. By irradiation with pulsed electron beams having this characteristic, most of the components in the gas stream 6 are converted to $NH_4NO_3$.

The following example is provided for the purpose of further illustrating the invention but is in no way to be taken as limiting.

EXAMPLE 1

Figure 6:
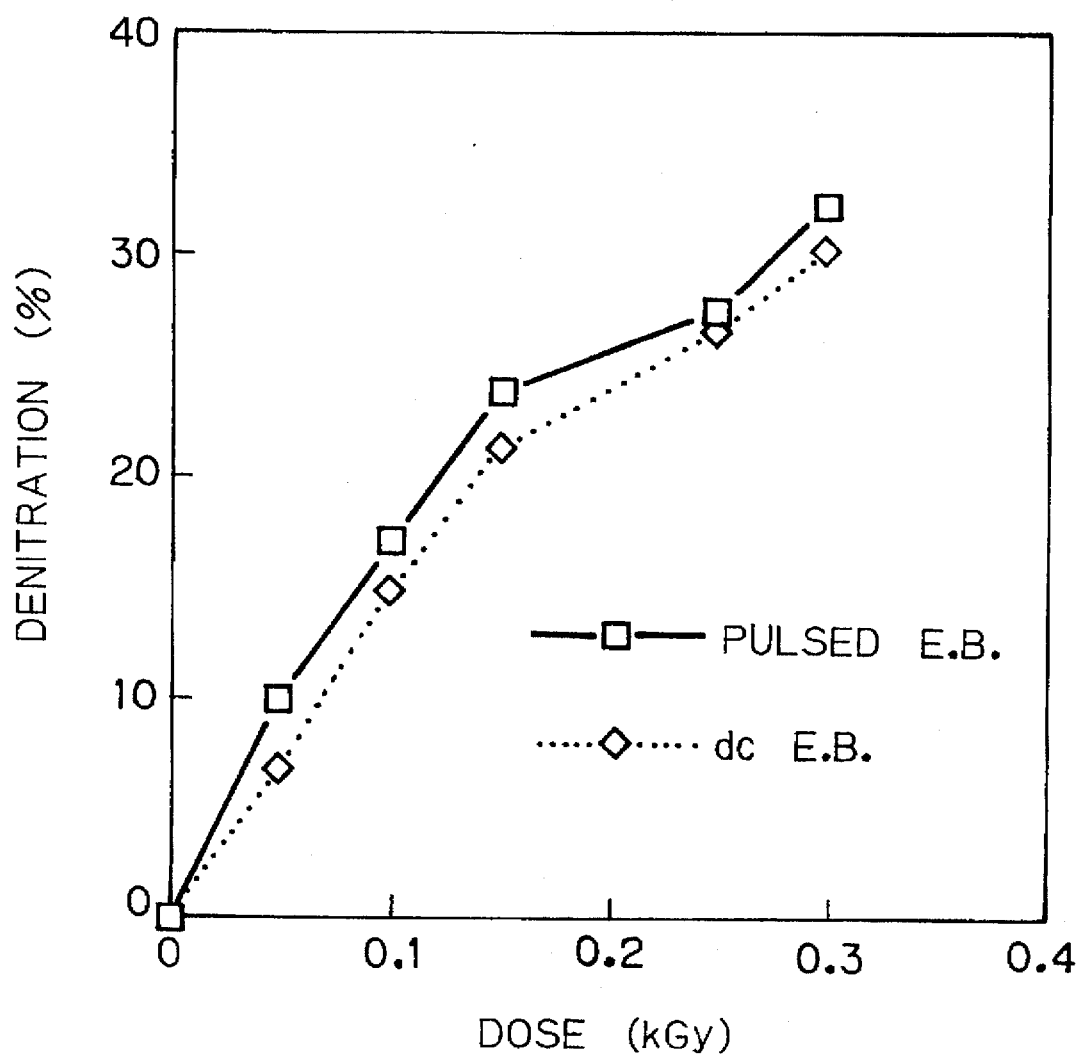
FIG. 6 is a graph comparing pulsed electron beams with dc electron beams in the efficiency of NOx removal.

An exhaust gas at 20° C. that was flowing in a volume of 15 NL/sec at a rate of 1.0 m/s with the initial NOx concentration being 5 ppm was supplemented with ammonia gas in an amount equivalent to NOx which were the components to be removed from the exhaust gas. At an energy of 250 keV, the exhaust gas was irradiated with either pulsed electron beams (for their conditions, see below) or dc electron beams at varying doses of 0–0.3 kGy and comparison was made of the reduction in the amount of NOx. The reduction of NOx by irradiation with pulsed electron beams (I) was in all cases greater than the reduction of NOx by irradiation with dc electron beams (II), indicating the higher ability of the pulsed electron beams to remove NOx. Depending upon the dose of electron beams, the ratio of (I) to (II) varied from about 1.05 to about 1.5, indicating the superiority of the pulsed electron beams to the dc electron beams. The results of the comparison are shown in FIG. 6.

The conditions for the application of the pulsed electron beams were as follows: frequency, 10–400 Hz; duration, $5\times10^{-5}$ second; the time interval of non-irradiation region, $10^{-1}$ second. In Example 1, the dose of irradiation with pulsed electron beams was adjusted by varying the pulse frequency.

What is claimed is:

1. A method of irradiating an ammonia-supplemented exhaust gas that at least contains nitrogen oxides (NOx) with electron beams at a dose of 0.1–30 kGy to form by-products, comprising the steps of:

flowing the exhaust gas at a rate of 1.0–25 m/s and at a temperature not lower than a dew point of the exhaust gas and not higher than 100° C.;

irradiating the exhaust gas with electron beams having a pulsed temporal and spatial shape within an electron beam generator, and having a pulse frequency and duration in respective ranges of 10 Hz–100 kHz and $10^{-8}$–$10^{-5}$ second followed by a non-irradiation time that lasts for a time interval of $10^{-5}$–$10^{-1}$ second.

2. The method according to claim 1, further comprising the step of diverging the electron beams as emitted from the electron beam generator in an electric or magnetic field.

* * * * *